D

United States Patent
Benson et al.

(10) Patent No.: US 7,240,073 B2
(45) Date of Patent: Jul. 3, 2007

(54) RULES CUSTOMIZATION AND RELATED METHODS

(75) Inventors: Max L. Benson, Redmond, WA (US);
Michael Jerger, Redmond, WA (US);
Edward H. Wayt, Seattle, WA (US);
Kenneth Mark, Kirkland, WA (US);
Kim Cameron, Bellevue, WA (US);
Matthias Leibmann, Woodinville, WA (US); Jing Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 10/435,708

(22) Filed: May 8, 2003

(65) Prior Publication Data

US 2004/0225674 A1   Nov. 11, 2004

(51) Int. Cl.
*G06F 7/00* (2006.01)
*G06F 17/00* (2006.01)
(52) U.S. Cl. .................. 707/103 R; 707/101; 707/102
(58) Field of Classification Search .................... 707/2, 707/10, 101, 103 R, 102, 103; 709/220
See application file for complete search history.

(56) References Cited

U.S. PATENT DOCUMENTS

| | | | |
|---|---|---|---|
| 4,999,766 | A | 3/1991 | Peters et al. |
| 6,185,574 | B1 | 2/2001 | Howard et al. |
| 6,202,085 | B1 | 3/2001 | Benson et al. |
| 6,269,406 | B1 | 7/2001 | Dutcher et al. |
| 6,343,287 | B1 * | 1/2002 | Kumar et al. .................. 707/4 |
| 6,496,837 | B1 | 12/2002 | Howard et al. |
| 6,523,042 | B2 | 2/2003 | Milleker et al. |
| 6,523,046 | B2 | 2/2003 | Liu et al. |
| 6,542,515 | B1 * | 4/2003 | Kumar et al. ................ 370/463 |
| 6,651,047 | B1 * | 11/2003 | Weschler, Jr. ................... 707/1 |
| 6,757,720 | B1 * | 6/2004 | Weschler, Jr. ............... 709/220 |
| 6,823,336 | B1 | 11/2004 | Srinivasan et al. |
| 6,859,217 | B2 | 2/2005 | Robertson et al. |
| 6,990,513 | B2 | 1/2006 | Belfiore et al. |
| 2002/0030703 | A1 | 3/2002 | Robertson et al. |
| 2002/0059425 | A1 | 5/2002 | Belfiore et al. |
| 2002/0156792 | A1 | 10/2002 | Gombocz et al. |
| 2003/0105654 | A1 | 6/2003 | MacLeod et al. |
| 2003/0131025 | A1 | 7/2003 | Zondervan et al. |

(Continued)

OTHER PUBLICATIONS

Steen et al. "Integrating ABB Aspect Directory with Microsoft Active Directory", Thesis Paper—The Department of Computer Science and Electronics, Malardalens Hogeskola University, pp. 44-58, 2001.*
Robertson, et al., "Polyarchy Visualization: Visualizing Multiple Intersecting Hierarchies", CHI 2002, Minneapolis, MN, USA, Apr. 20-25, 2002, 8 pages.

(Continued)

*Primary Examiner*—Jeffrey Gaffin
*Assistant Examiner*—Michael J Hicks
(74) *Attorney, Agent, or Firm*—Lee & Hayes, PLLC

(57) ABSTRACT

Subject matter includes exemplary flexible rules for defining an information management process, for example a process that manages information being transferred between databases or with respect to an exemplary metadirectory. The flexible rules have inherent logic to define part of an information management action or a database structure and perform a call out for custom logic. The custom logic performs or defines another part of the information management action or database structure. Besides the exemplary flexible rules, the subject matter describes exemplary identity information management processes, engines, and related methods.

20 Claims, 9 Drawing Sheets

U.S. PATENT DOCUMENTS

| | | |
|---|---|---|
| 2003/0140210 A1 | 7/2003 | Testardi |
| 2004/0064502 A1 | 4/2004 | Yellepeddy et al. |
| 2004/0230559 A1 | 11/2004 | Newman et al. |
| 2005/0188367 A1* | 8/2005 | Oberholtzer ................ 717/168 |

OTHER PUBLICATIONS

Steen et al., Master Thesis in Computer Engineering; Integrating ABB Aspect Directory with Microsoft Active Directory; 76 pages.

Zhou, "Directory Integration and the Metadirectory", 1999, pp. 1-12.

* cited by examiner

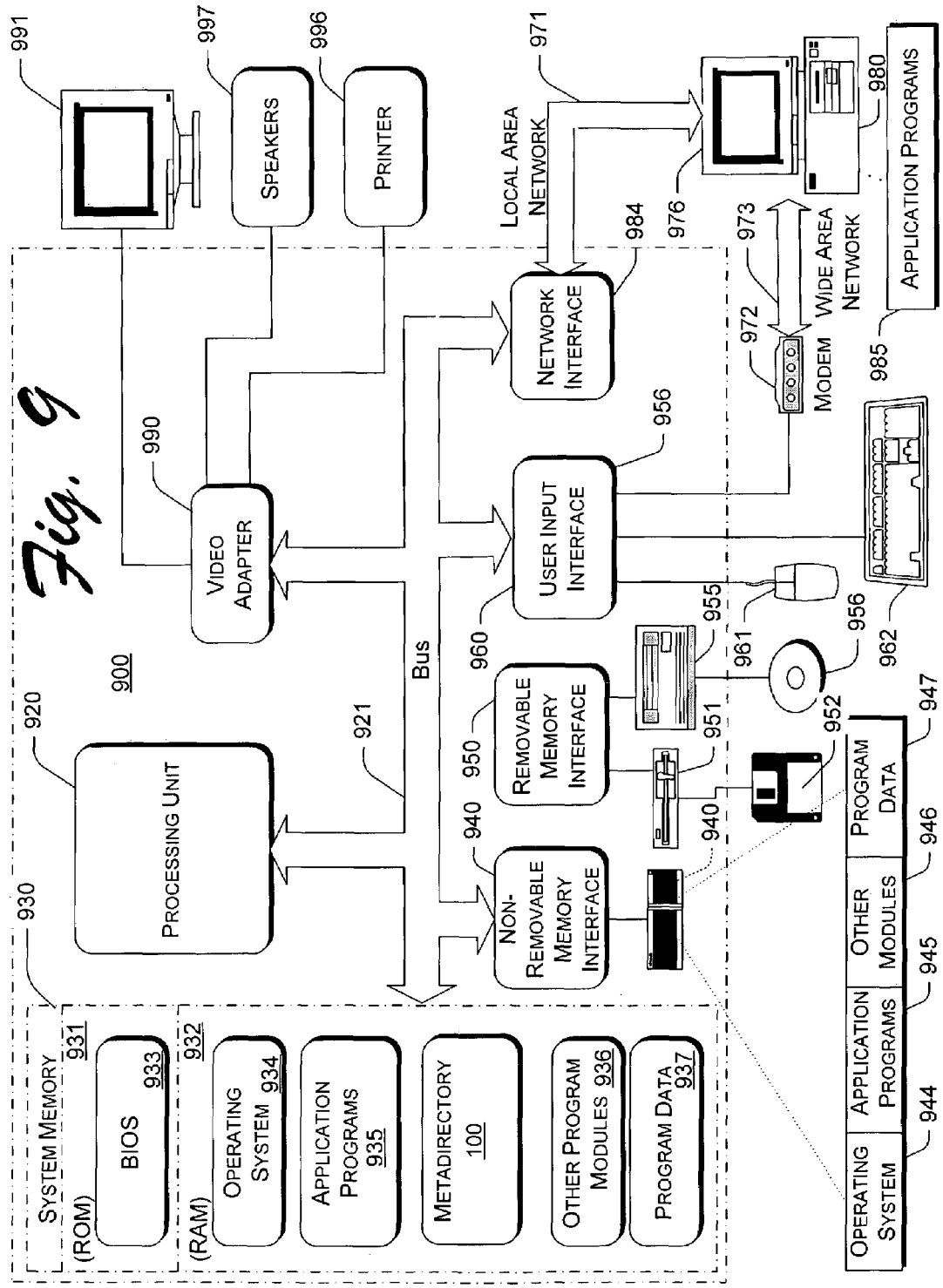

RULES CUSTOMIZATION AND RELATED METHODS

CROSS-REFERENCE TO RELATED APPLICATIONS

"The instant application is related to co-pending U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth; U.S. patent application Ser. No. 10/435,113, entitled "Declarative Rules for Metadirectory," by Kim Cameron, Max L. Benson, and James Booth; U.S. patent application Ser. No. 10/434,726 entitled "Relational Directory," by Kim Cameron, James Booth, Matthias Leibmann, Max L. Benson and Mark Brown; U.S. patent application Ser. No. 10/435,720, entitled "Associating and Using Information in a Metadirectory," by Max L. Benson; U.S. patent application Ser. No. 10/435,712, entitled "Preview Mode," by Kim Cameron, Max L. Benson, Derek Murman, Edward H. Was, Jeffrey Bisset, Jie Liu, and Jing Wu; U.S. patent application Ser. No. 10/434,411, entitled "Automated Information Management and Related Methods," by Max L. Benson, Stephen Siu, and James Booth; all of which are filed concurrently herewith, assigned to the assignee of the present invention, and incorporated herein by reference for all that they teach and disclose."

TECHNICAL FIELD

The subject matter relates generally to database connectivity and more specifically to rules customization.

BACKGROUND

An average company has many accounts, storage repositories, directories, and systems that include information about people, computers, and network entities. Often, such sources of information are not necessarily designed to work together or to achieve consistency or harmony of information. For ex ample, a company's computer network settings, printer settings, telephone system configuration, and quality of service policy may be redundantly spread across client computers, servers, network devices, and directory services. Network security policy may reside in both network devices and firewall services. A company's management profile, company policy, and personnel database may be spread across different directories on different servers. Employee demographics may reside partly on email servers that have mailbox and address information, and partly in other various accounts and departments, such as recruiting, payroll, employee benefits, production scheduling, and performance evaluation. Information spread across these various repositories is typically uncoordinated and/or redundant. Further, since each account or system typically uses a slightly different storage format, the information is also apt to be inconsistent and incomplete when compared to a hypothetical complete and accurate record of identifying information (e.g., "identity information") about a person or entity. An employee's health record, for example, if it is seldom accessed, may maintain an incorrect or missing home address for years.

To overcome such problems, various systems rely on master directory schemata, such as metadirectory systems, that try to unify identity information from heterogeneous sources into a single record of preferred information or at least into a preferred format. A metadirectory may be a key directory that provides an overarching view of multiple directories and may be able to consolidate information in multiple directories and manage relationships between existing directories, allowing data to flow between these connected directories.

The problem with conventional schemes is that they are too rigid or too flexible. Rigid schemes provide canned code that does not allow a user, for example, a large business organization, to create a master directory system that suits their unique needs. Rigid code limits a business organization by forcing integration of only those data objects and attributes allowed by the code, lacking capacity for others, while sometimes requiring integration of objects that the organization does not need.

Flexible schemes do not provide a structurally sound foundation upon which a powerful integrated information system can efficiently be built. In other words, by spending great time and expense a flexible scheme could be produced that suits the unique data integration needs of a large business organization, but producing the final working system is like reproducing the complexity of a computer operating system from scratch. The resulting system would be expensive and so completely customized and interwoven with the originating business organization that it would not be usable at a different business organization.

SUMMARY

Subject matter includes exemplary flexible rules for defining an information management process, for example a process that manages information being transferred between databases or with respect to an exemplary metadirectory. The flexible rules have inherent logic to define part of an information management action or a database structure and perform a call out for custom logic. The custom logic performs or defines another part of the information management action or database structure. Besides the exemplary flexible rules, the subject matter describes exemplary identity information management processes, engines, and related methods.

BRIEF DESCRIPTION OF THE DRAWINGS

FIG. 9 is a block diagram of an exemplary computing device suitable for use with the subject matter.

DETAILED DESCRIPTION

Overview

Figure 1:
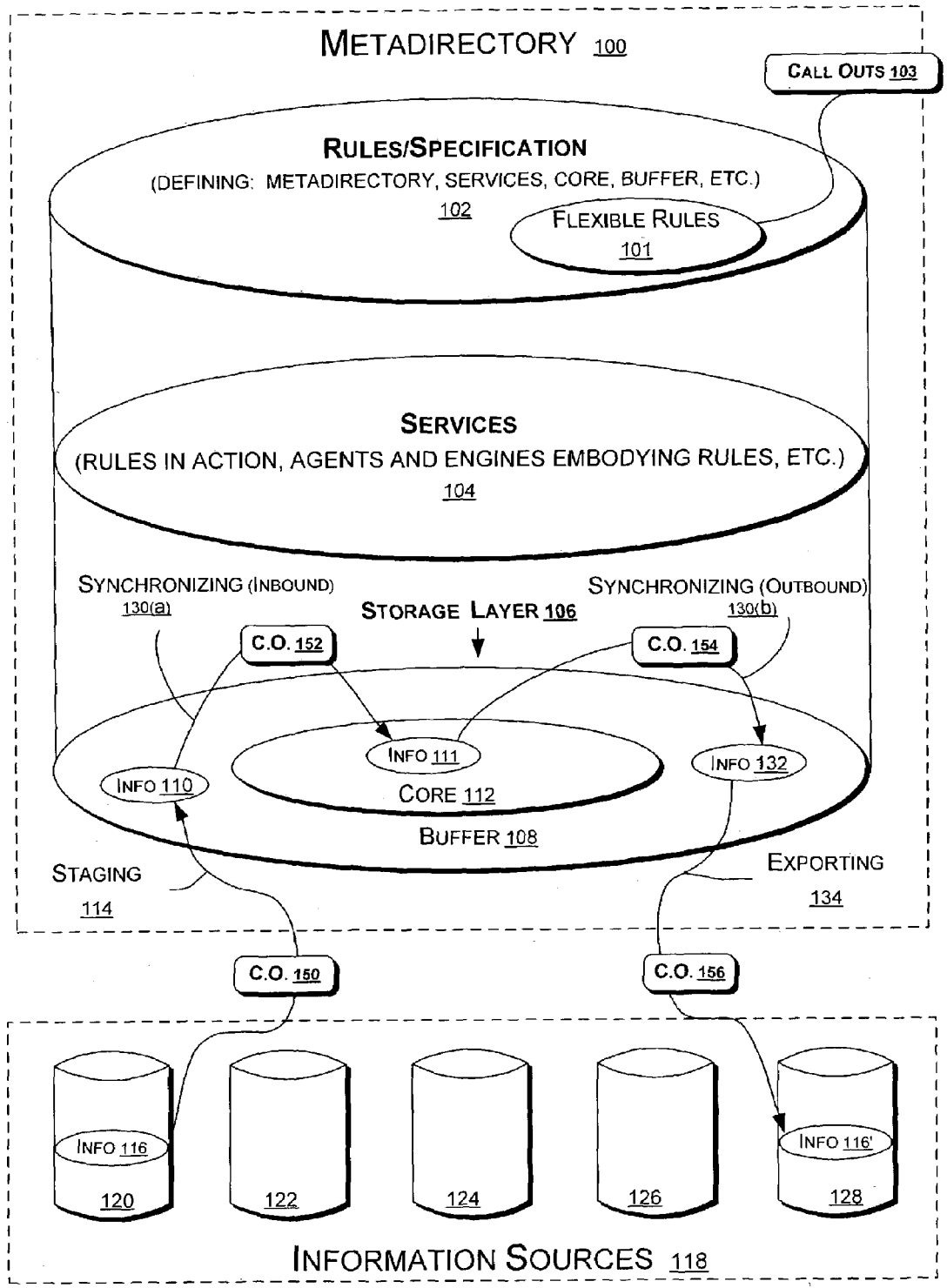
FIG. 1 is a graphic representation of an exemplary metadirectory having exemplary flexible rules.

The subject matter described herein includes customization of rules used for information systems, such as information systems that unify or integrate data derived from diverse information sources using a database, a central information core, an information integrator, a master database, a master directory, a directory service, a metadirectory, etc., (such an information system that can contain, unify, or integrate data will be referred to herein as a "metadirectory system" or a "metadirectory"). A metadirectory can be used to unify or integrate information from diverse sources into a "unified identity" of the information, e.g., a single "record" or set of objects that brings accord to diverse identity information, in a central space where a user can more easily see and make changes based on the unified identity than seeing and changing multiple fragmented records, each bearing only part of the information.

In conventional systems, defining rules are typically fixed for fear alteration of a rule may compromise an associated directory system, however, a close analysis of rules often demonstrates that alteration of some rules within certain bounds will not compromise stability. Therefore to the extent possible, the interplay between bounds and flexibility should be capitalized on to create an extensible system.

If an exemplary metadirectory system can afford to be flexible without sacrificing stability, security, reliability, interoperability, data integrity, etc., then why not offer some of the flexibility to a user? Exemplary rules can be designed to offer that flexibility to a user or administrator, recognizing that certain rules or certain static parts of rules cannot be altered or can be altered only within bounds, because some alterations compromise the stability of the exemplary metadirectory system. Thus, to the extent possible, the exemplary flexible rules described herein discriminate between stability and extensibility, offering extensibility where stability would not be compromised. Even in a lightweight directory system, key features or key rules can be maintained that keep the system lightweight while yet offering additional services, features, and extensibility that broaden functionality or adaptability.

In a metadirectory, business rules may be enforced by a process bringing accord to objects, accounts, and attributes across a set of information sources such as the aforementioned directories, databases, and other systems. Many times, these rules define simple actions, such as directly copying a value for an attribute in one system to another system. However, more complex logic is frequently required. For example, in one system an account name might be the two attributes "firstName" and "lastName", while in another system it is the attribute "displayName". In this case a simple copy rule is not sufficient. An exemplary flexible rule, also known in some implementations as a custom rule extension, can be created to concatenate, in this example, the two attributes and "flow" the resulting concatenated single name to a displayName attribute in another system.

In an exemplary metadirectory, at least some of the rules mentioned above define structure of the metadirectory while the same rules or different rules define actions or functions that take place in the metadirectory. Both types of definitions contained in the rules (those pertaining to "structure" and those pertaining to "function") maintain the effectiveness, adaptability, and stability of such a metadirectory. Stability means that the metadirectory performs according to a basic plan, as defined by associated rules that allow for scalability to large and complex systems that integrate many different types of information resources.

Subject matter includes exemplary well-defined metadirectory rules that are optionally customizable. Further, some exemplary rules are customizable in multiple ways simultaneously. Such exemplary rules may include a static, non-flexible rule part that carries out the exemplary metadirectory's basic plan, and a flexible rule part that allows rule customization using one or more types of customization. Accordingly, an exemplary rule may control the amount of flexibility allowed in customizations in order to preserve stability of a metadirectory. In other words, an exemplary rule can maintain a metadirectory's structures and functions in a manner that disallows types of flexibility that would be detrimental to a basic plan of the metadirectory. Such exemplary rules that include a non-flexible part and allow for one or more flexible customization parts (e.g., requests or call outs for custom logic from outside an exemplary metadirectory system), will be referred to herein as "flexible rules."

At another level of detail, non-flexible parts of exemplary flexible rules allow an associated exemplary metadirectory system to remain safe from significant error during its operation and also to maintain a portability so that excessive flexibility does not prevent the exemplary metadirectory from being used successfully in many different types of business settings. Hence, inclusion of a flexible part in an exemplary flexible rule allows almost unlimited adaptation to a user's needs.

To accept custom input from a user, an exemplary flexible rule is tolerant of customized directions rendered in a host of formats and programming languages. The ability of the exemplary flexible rules to accept customized directions from a user can allow a user to custom-connect unique information sources to the exemplary metadirectory that would be difficult or impossible to connect without the flexible rules, and to custom-select combinations of information and attributes to be used in the exemplary metadirectory that would be difficult or impossible to select without the flexible rules.

In one implementation, a given exemplary flexible rule specifies a metadirectory structure or action with a "stripped-down" but well-defined and even deterministic basic line of inherent logic, to which a first type of customization, referred to herein as "stock customization" of the exemplary flexible rule, is allowed within certain limits—i.e., limits that prevent the allowed customization from endangering the integrity of the metadirectory, as described above. "Stock" as used herein just means that a specific customization choice is more or less supplied along with the metadirectory system, i.e., built into the rules-specification in one fashion or another. The stock customization may include adjusting the inherent logic of the basic rule with short declarative statements, for example, logical operators presented for user selection in a user interface (UI) that limits the choice of customizations by means of a menu having checkboxes. Along with these "stock" or "declarative" customizations that the exemplary flexible rule can be endowed with, the exemplary flexible rule can also be simultaneously customized in additional ways.

In one implementation, simultaneous additional customization is achieved by the exemplary flexible rule calling out for custom logic, e.g., a custom rule extension, at certain stages or breakpoints during a process that the exemplary flexible rule is performing or participating in, whether the process consists of defining a metadirectory structure or defining a metadirectory action. In other words, the exemplary flexible rule can logically "stop" or "branch" at certain points in a process to call out for user input or customized logic supplied by a user or other source. The customized logic called out for can be a program, routine, script, etc., that allows more complex logic than available in stock customization options and can be formatted in a well-structured programming format that may not be possible with the stock customizations. Depending on the implementation, an exemplary flexible rule that performs a call out for custom logic but no custom logic is available, may default back to inherent or stock logic or may return an error message. Thus, these "call out" type customizations for customizing exemplary flexible rules can be used in addition to or instead of the "stock" or "declarative" customization options that may be supplied with an exemplary metadirectory and various mechanisms can be employed for handling the presence or absence of custom logic when a call out for custom logic is performed.

Both a stock customization of an exemplary flexible rule and the simultaneous ability of the exemplary flexible rule to perform a call out for a piece of custom logic at given points in a process are kept within safe bounds, as mentioned, so that the stability of the exemplary metadirectory is not ruined.

Exemplary Metadirectory

As shown in FIG. 1, an exemplary metadirectory 100 according to the subject matter can be understood in terms of various layers. An exemplary rules layer 102 provides rules (schemata, specifications, definitions, etc.) including exemplary flexible rules 101 for implementing the exemplary metadirectory 100. These rules may drive, implement, or be actualized in various actions, agents, engines, and/or objects of other exemplary layers, such as an exemplary services layer 104 for performing actions (e.g., management) and an exemplary storage layer 106 for holding information. In one implementation, the storage layer 106 has a buffer storage space ("buffer") 108, which serves as an intermediate staging space for "buffer information" 110 going to or coming from a core storage space ("core") 112. The buffer 108 may have its buffer information 110, 132 imported in a process known as "staging" 114 from connected information 116 stored in one of multiple disparate information sources 118 (e.g., one of 120, 122 124, 126, 128), such as a directory, a MICROSOFT® ACTIVE DIRECTORY type of directory, an SQL type database, a lightweight directory access protocol (LDAP) directory, a file, another metadirectory system, and other proprietary database and email address repositories. The core 112 stores or persists information known as "unified identity information" 111 that is taken (i.e., preferred, selected, filtered, unified, integrated, etc.) from the buffer information 110 in the buffer 108 according to the rules in the rules layer 102 in a process called "synchronizing" 130(a), 130(b). A piece or object of unified identity information 111 provides a persistent view or representation of information that may be stored in many different forms and many different stages of completeness in the connected information sources 118.

Synchronizing 130 between the core 112 and the buffer 108 can be "inbound" 130(a) to the core 112 or "outbound" 130(b) from the core 112. Thus, the unified identity information 111 in the core 112 is taken or derived only indirectly from the multiple disparate information sources 118 since the buffer 108 intervenes. In synchronizing 130, an exemplary flexible rule 101 (e.g., embodied in an agent or service) performs (inbound) data aggregating by updating a piece of unified identity information 111 in the core 112 based on buffer information 110 staged in the buffer 108 or, the same or another exemplary flexible rule performs (outbound) account managing by updating a piece of buffer information 132 in the buffer 108 based on a piece of unified identity information 111 in the core 112. Appropriate information from the updated buffer information 132 gets exported to an appropriate information source (e.g., one of 120, 122, 124, 126, 128).

For exporting 134, the user may select an attribute or value viewed in a piece of unified identity information 111 to be applied to all connected information sources 118. An exemplary flexible rule may create a staged object to reflect the attribute or value to be exported. The same or another exemplary flexible rule 101 then exports the attribute change or value to each connected information source 118.

Thus, once unified and/or integrated, the unified identity information 111 achieved in the core 112 may be used to administer the information sources 118. Through (outbound) synchronizing 130(b), changes to the unified identity information 111 in the core 112 can be represented in the buffer information 132. Through "exporting" 134, the buffer information 132 can be distributed to change, augment, or replace connected information 116' in an information source 128.

Within this basic exemplary metadirectory 100 just described, the flexible rules 101 provide opportunities for the user to customize the exemplary metadirectory 100 at many different points via flexible rule call outs 103, without destroying the structure and function of the exemplary metadirectory 100. For example a flexible rule 101 defining the process of staging 114 may have a call out 150 for custom logic that allows the metadirectory user to connect an unconventional information source to the exemplary metadirectory 100 and perform custom filtering of attributes. A flexible rule 101 defining an inbound synchronization process 130(a) may have a call out 152 for custom logic that allows the metadirectory user to create custom, even counterintuitive, unified identity information objects 111 consisting of rarely-used combinations of attributes. A flexible rule 101 for outbound synchronizing 130(b) may have a call out 154 for custom logic that allows a metadirectory user to set up a unique system of automatically configuring accounts for new employees. Yet another flexible rule 101 for exporting 134 may have a call out 156 for custom logic that allows the metadirectory user to output business updates to hundreds of heterogeneous accounts in various departments of a large multinational corporation.

Figure 2:
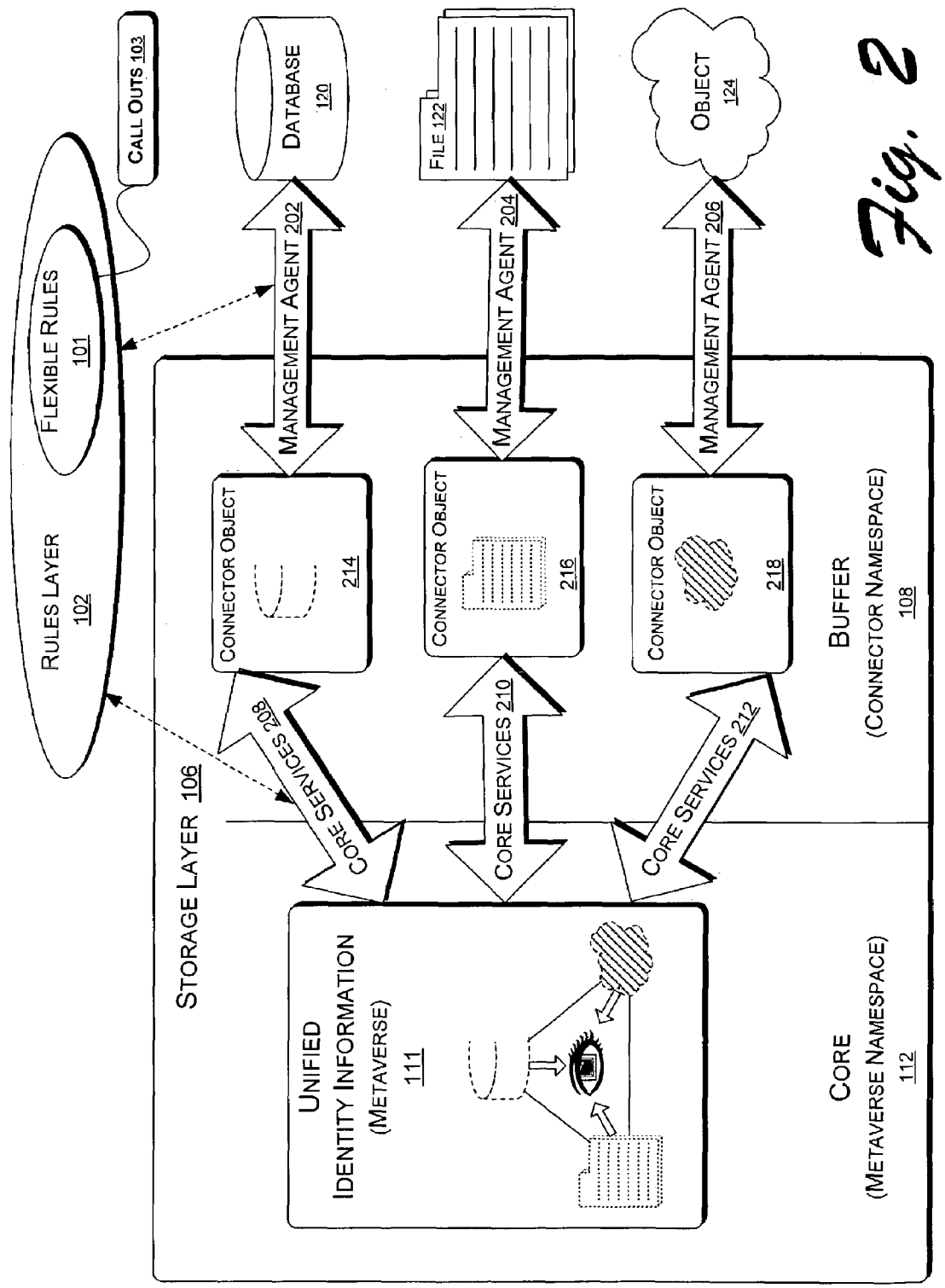
FIG. 2 is a block diagram of one implementation of the exemplary metadirectory having flexible rules.

FIG. 2 shows the exemplary rules layer 102 and the exemplary storage layer 106 (of FIG. 1) as implemented in MICROSOFT® METADIRECTORY SERVICES metadirectory products and MICROSOFT® IDENTITY INTEGRATION SERVER ("MIIS") products, e.g., "MIIS 2003" or just "MIIS," providing an example environment for practicing the subject matter (Microsoft Corporation, Redmond, Wash.).

In an MIIS context, the buffer 108 can be implemented as an MIIS connector namespace, and the core 112 can be implemented as an MIIS metaverse namespace, wherein a metaverse is one or more pieces or objects of the unified identity information 111. The buffer 108 allows object staging, which in turn allows unified identity information 111 in the core 112 to be composed of selected objects and attributes of buffer information 110 called connector objects 214, 216, 218 in order to maintain integrated information from multiple connected information sources 118 while being able to adapt to the unique characteristics of each individual connected information source (e.g., 120, 122, 124, 126, 128).

The services layer 104 can use or embody exemplary flexible rules 101 from the rules layer 102 in objects known as agents or management agents (MAs) 202, 204, 206 to cause information to flow and/or otherwise be manipulated. For example, in one implementation an MA embodying one or more of the exemplary flexible rules 101 can discover the contents of a connected information source (e.g., one of 120, 122, 124, 126, 128), call out for custom logic, (for example, custom logic to perform a data transformation on some of the information) and then place object entries from the connected information source (e.g., 120) into the buffer 108 (i.e., the MIIS connector namespace) according the inherent logic of the flexible rule and/or the custom logic obtained from the call out 103. The same or another exemplary flexible rule can then call out again for custom logic and place an appropriate object from the buffer 108 into the core 112 (i.e., the MIIS metaverse namespace) according to the inherent logic of the flexible rule and/or the custom logic. Further, another process using an exemplary flexible rule may call out for custom logic and cause mapping of at least some information (e.g., data, attributes, etc.) from an object in the core 112 to an object in the buffer 108 according to its inherent logic and/or the custom logic called out for. In the latter instance, yet another, or the original, process or agent using an exemplary flexible rule may yet again call out for custom logic and then cause mapping of at least some information from the object in the buffer 108 to the connected information source (e.g., 128) according to the inherent logic of the flexible rule and/or the custom logic obtained from the call out.

In general, the exemplary flexible rules used "alone" or as embodied in an agent, MA, process, schema, etc., may be configured to call out for custom logic and to act in any specific manner to define and/or control various processes according to the inherent logic in the exemplary flexible rule and/or the custom logic called out for. The custom logic, to reiterate, is information set up by a user or other entity outside an exemplary metadirectory 100. For example, each MA 202, 204, 206 that uses an exemplary flexible rule 101 may be inherently configurable to deploy inclusion logic, exclusion logic, attribute flow rules, filters, join and projection rules, object deletion rules, provisioning and deprovisioning rules, etc. and also to call outside of the resources of the exemplary metadirectory 100, including the rules in the rule layers 102 of the exemplary metadirectory 100, to obtain custom logic, e.g., from a user, not contemplated in the stock customizations already supplied with an exemplary metadirectory 100.

In an MIIS context, for example, the exemplary flexible rules 101 allow a user to perform actions beyond what can be performed in the MIIS IDENTITY MANAGER. For example creating new attribute values from a combination of existing attribute values, creating logic for sophisticated filters, resolving complex object conflicts, resolving unwanted "joins," handling advanced object ownership and attribute precedence, transforming and converting data types between different systems may be beyond the stock customizations possible with a given exemplary metadirectory 100 or may just be easier to implement with an exemplary flexible rule 101. Sometimes there may be no obvious way to accomplish a task without an exemplary flexible rule call out 103, for example, in some implementations when a new object needs to be provisioned into other systems. Upon detection or connection of a new information source (e.g., one of 120, 122, 124, 126, 128) by the exemplary metadirectory 100, an exemplary flexible rule may initiate a process that communicates information and generates an imported object into the buffer 108.

The buffer information 110, 132 can include many types of information, only a part of which becomes unified identity information 111 in the core 112. For example, a piece of buffer information 110 can be present for metadirectory housekeeping and not connected to the core 112 at all. At least some of the buffer information 110, 132 can consist of a representation, (e.g., a MIIS connector object or a shadow, data image, template, view, etc.) of selected identity information residing in (or from the perspective of) a connected information source (e.g., one of 120, 122, 124, 126, 128). Accordingly, an exemplary flexible rule 101 can use such a representation or object in the buffer 108 to stage information between the connected information source and the unified identity information 111. For example, an exemplary flexible rule 101 may contain custom business logic or a custom template that imports changed information (e.g., a "delta" object containing changed attributes or values) via a MIIS connector object from a previously imported state of the connected information source (120, 122, 124, 126, 128).

A piece of buffer information 110 (as a staged object) can represent instances of selected object classes from a connected information source (120, 122, 124, 126, 128) specified by an exemplary flexible rule 101. Such a staged object may also carry current values of business attributes and operational information used by the exemplary metadirectory system to carry out inbound and outbound synchronizing 130.

In instances where buffer information 110, 132 is not joined to unified identity information 111 the buffer information 110, 132 may be referred to as disconnected information (i.e., a disconnector object). Whereas a connector object represents an object imported from a connected information source (one of 120, 122, 124, 126, 128) that has been joined to a piece of unified identity information 111, a disconnector object represents an object that is not joined to unified identity information 111. Disconnector objects are typically used to represent functional accounts, administrator IDs, etc., which do not always correspond to a piece of unified identity information 111.

Thus, a staged object in the buffer 108 is automatically a disconnector object upon creation from a new connected information source (e.g., one of 120, 122, 124, 126, 128), but becomes redefined as a connector object when joined to or projected as unified identity information 111. A staged object in the buffer 108 created for export is automatically a connector object if it already has some link to unified identity information 111.

The exemplary flexible rules 101 can allow designers of metadirectories, for example using MIIS, much greater flexibility and power to implement business logic in their metadirectory services. The exemplary flexible rules 101 can be used within the MICROSOFT®.NET™ FRAMEWORK and can be created by a user or metadirectory administrator in any programming language that targets the MICROSOFT® COMMON LANGUAGE RUNTIME (CLR) (e.g., any programming language and compiler that creates a .NET™ FRAMEWORK class library, such as MICROSOFT® VISUAL BASIC .NET, the C# programming language with the compiler shipped in MICROSOFT® VISUAL STUDIO® .NET™, MICROSOFT® PLATFORM SOFTWARE DEVELOPMENT KIT (SDK), etc.).

In an MIIS context, the call out 103 aspect of an exemplary flexible rule 101 can be embodied in a rules extension, for example, in a MICROSOFT® .NET™ Framework assembly. Such an example assembly can be a class library in the form of a dynamic link library (.dll) file that implements a customized set of instructions for managing information.

Figure 3:
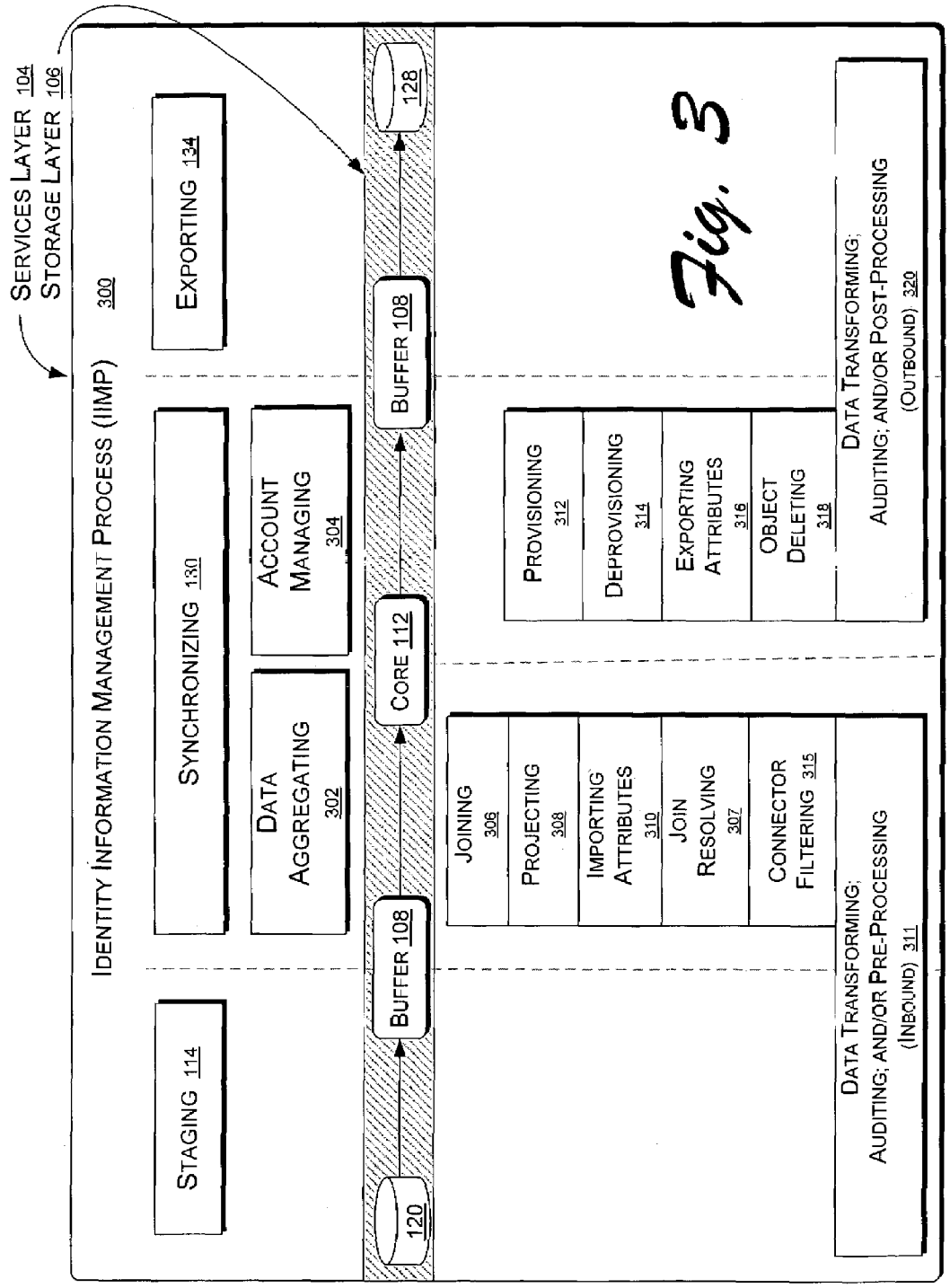
FIG. 3 is a block diagram of an exemplary identity information management process.

FIG. 3 shows an exemplary "identity information management process" (IIMP) 300 that can be implemented using the exemplary flexible rules 101 in the exemplary metadirectory 100. Exemplary flexible rules 101 used in the exemplary IIMP 300 can be customized using multiple simultaneous types of customization, such as the stock type of customization and the call out 103 type of customization described above.

The exemplary IIMP 300 includes the staging 114, synchronizing 130(a), 130(b), and exporting 134 described above, and when viewed with respect to unified identity information 111 stored in a core 112, then added levels of processing may be introduced that aim to provide functionality and ensure data integrity across more than one connected information source (e.g., 120, 122, 124, 126, 128). Such additional processes include, for example, data aggregating 302, and account managing 304. Further, such additional processes may have sub-processes. For example, data aggregating 302 may include joining 306, projecting 308, importing attributes 310, join resolving 307, connector filtering 315, and data transforming, auditing, and/or pre-processing 311. Joining 306, in one implementation, is the process of linking a buffer object to a core object. Exemplary flexible rules for importing attributes 416 can define which attributes flow from the buffer 108 to the core 112. In one implementation, joining 306 includes the process of relating parts of the unified identity information 111 to each other. Data transforming, auditing, and/or pre-processing during staging and/or import can include normalizing inbound data, changing data formats, calling out to systems external to an exemplary metadirectory 100, such as workflow systems, to request or trigger further processing, etc . . .

Account managing 304 may include provisioning 312, deprovisioning 314, exporting attributes 316, object deleting 318, and data transforming, auditing, and/or post-processing. Data transforming, auditing, and/or post-processing during export can include reformatting data for an external system, normalizing outbound data, calling out to an external system, such as a workflow system, to request or trigger further processing, etc . . .

In general, such processes and/or sub-processes may be controlled by any of a variety of the exemplary flexible rules 101 having call outs for custom logic that pertain to ensuring that the most valued, most correct, and/or user-selected unified identity information 111 resides in the core 112 and in one or more connected information sources 118, as appropriate. Some of these processes and sub-processes will be discussed in more detail below with respect to customization of the exemplary flexible rules 101 by which they are implemented.

In some implementations of the exemplary metadirectory 100, such as the MIIS 2003 implementation, the processes in the exemplary IIMP 300 are executed in a relatively well-defined sequence, that is to say, the various parts of the exemplary IIMP 300 are not performed at random, haphazardly, or in total separation from each other.

Figure 4:
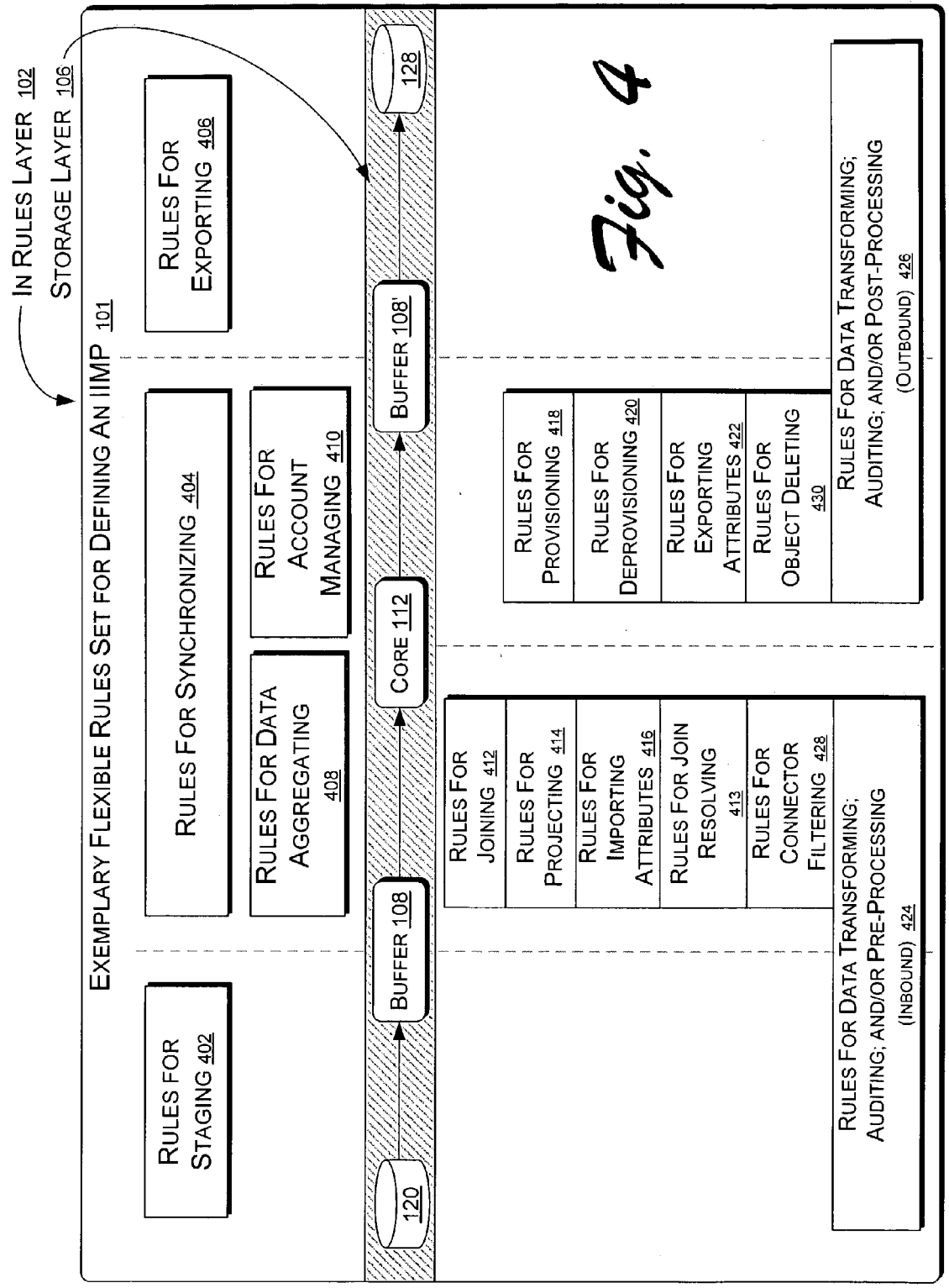
FIG. 4 is a block diagram of an exemplary set of flexible rules for defining the exemplary identity information management process.

FIG. 4 shows an exemplary set of rules 400 in the rules layer 102 for defining the exemplary IIMP 300 of FIG. 3. Each rule may be an exemplary flexible rule 101. An exemplary rules set 400 that includes multiple flexible rules having call out 103 customizations allows the exemplary metadirectory 100 to be customized for each specific portion of the exemplary IIMP 300 with logic supplied by a user that may not be available as a stock customization.

In one implementation, the flexible rules 101 having call out customizations 103 can be roughly divided into those associated with MAs, i.e., those that perform "agent-centric" processes between the buffer 108 and the core 112 relevant to only one connected information source 120, and those that perform "core-centric" processes between the core 112 and the buffer 108, relevant to all information sources 118. Exemplary agent-centric flexible rules that can have call out customizations 103 are rules for inbound and outbound data transforming 424, 426, rules for joining 412 and join resolving 413, rules for deprovisioning 420, rules for connector filtering 428, rules for projecting 414, and rules for importing and exporting attributes 416, 422. The custom logic allowed by a call out customization 103 is typically different for each specific connected information source (e.g., each of 120, 122, 124, 126, 128). Examples of core-centric rules that can have call out customizations 103 include rules for provisioning 418, rules for object deletion 430 (of core information), and other rules that control multiple different connected information sources 118 from the unified identity information 111 in the core 112. In one implementation, each MA 202, 204, 206 can have its own call out customization 103, i.e., the agent or service for each connected information source (e.g., each of 120, 122, 124, 126, 128) can have its own user supplied custom logic. The core-centric rules may also use one central call out customization 103 of their own. In other words, in some implementations, such as an MIIS implementation, each MA has one custom rules extension, and the services for the metaverse namespace ("in" the core 112) may have one custom rules extension. There may be many exemplary flexible rules 101 that access the same customization object.

The flexible rule(s) 101 defining, implemented by, or comprising an MA can include call out customizations 103 that are triggered at certain points during processes performed by the MA, i.e., at certain points during an exemplary IIMP 300. An exemplary flexible rule for connector filtering 428 has a call out for user-supplied logic that allows the metadirectory user to control which connected information 116 that is discovered (staged from a connected information source 120 to a space in the buffer 108 used by the agent or service) is to be excluded from synchronizing 130(a) with the unified identity information 111 in the core 112. This call out allows the exemplary flexible rule for connector filtering 428 to determine, based on the buffer attributes of objects in the buffer 108 representing the connected information 116, if values in the buffer 108 from the connected information 116 should be permitted to synchronize with unified identity information 111 in the core 112 or only processed to the buffer 108.

An exemplary flexible rule for projecting 414 has a call out for user-supplied logic that allows the metadirectory user to control via custom logic when new unified identity information 111, such as a new metaverse object in MIIS 2003, is to be created with a link between the unified identity information 111 and the buffer 108. Using this call out, the user can inspect the buffer information 110 from the connected information source 120 and determine if corresponding unified identity information 111, such as a metaverse object in MIIS 2003, should be created, and if so of what kind of unified identity information 111 should be created, e.g., what object type. The exemplary flexible rule for projecting 414 can then create a link between the buffer information 110 and the newly created unified identity information 111.

A "join" is the aforementioned logical link between a piece of buffer information 110 and a piece of unified identity information 111 in the core 112. The join indicates that the two pieces of information represent the same identity and allows attribute flow to occur between them.

An exemplary flexible rule for joining 412 has a call out for user-supplied logic that allows the metadirectory user to specify custom logic to determine, e.g., by searching unified identity information 111 in the core 112 or, in MIIS 2003 by searching the metaverse, what pieces of unified identity information 111 (e.g., objects) in the core 112 might be potential candidates for joining.

In some implementations, an exemplary flexible rule for join resolving 413 has a call out for user-supplied logic that allows the metadirectory user to evaluate one or more pieces of unified identity information 111 in the core 112 that were returned by a search (i.e., the search from the exemplary flexible rule for joining 412) to determine if any pieces of the unified identity information 111 are desirable for a join. In other words, the user can write custom logic to compare and evaluate the returned pieces of unified identity information 111 and accept one or reject them all. If a piece of unified identity information 111 is accepted it will be joined to the piece of buffer information 110 for synchronizing 404.

Exemplary flexible rules for importing and exporting attributes 416, 422 have call outs for user-supplied logic that allow the metadirectory user to specify custom logic to perform more complex manipulations and transformations or implement checks on attribute values as they flow in and out of the core 112 than are possible with stock customizations.

Exemplary flexible rules for inbound and outbound data transforming, auditing, and/or pre and post-processing 424, 426 allow, in some implementations, a call out 103 (e.g., 150 and/or 152 for inbound; 154 and/or 156 for outbound) to be made for custom logic for transforming data (normalizing data, changing a data format, data type, performing low level numeric conversion, etc . . . ), auditing operations, or pre and post-processing (e.g., calling out to external systems, such as workflow systems, to request and/or trigger additional or further processing.

An exemplary flexible rule for deprovisioning 420 has a call out that allows the metadirectory user to use custom logic to determine the fate of buffer information 110 that has its "join" (or link) to unified identity information 111 in the core 112 broken. In an MIIS 2003 context, the buffer information 110 may be a connector object 214, 216, 218 and when its "join" is removed it can remain a disconnector object in the buffer 108 or the a connector object 214, 216, 218 can be deleted from the buffer 108. The deprovisioning custom logic can also set some buffer attributes for exporting to connected information sources 118, i.e., an export flow that gets triggered when an object is disconnected, accomplished via one deprovisioning rule call out.

The "core-centric" exemplary flexible rules 101 pertain to schemata, services (e.g. 208, 210, 212), or actions, etc. that handle unified identity information 111 in the core 112 relevant to multiple or all of the connected information sources 118.

A core-centric exemplary flexible rule for provisioning 418 has a call out that allows the metadirectory user to use custom logic whenever there is a change to an attribute value of a piece of unified identity information 111 or, a "join" (a link between buffer information 110 and unified identity information 111) has been created or broken. The exemplary flexible rule for provisioning 418 allows the metadirectory user to create and link pieces of buffer information 110 (e.g., objects) to pieces of unified identity information 111 (e.g., metaverse objects), perform deprovisioning 314 in the core 112 (remove a link between buffer information 110 and unified identity information 111), or rename a piece of buffer information 110 (e.g., a connector object—one of 214, 216, 218) that is joined to a piece of unified identity information 111 in the core 112. Thus, the core-centric exemplary flexible rule for provisioning 418 enables basic execution of the classic "hire/fire" scenario wherein user accounts are automatically created or deleted from central metadirectory control when an employee is hired or fired.

The core-centric and agent-centric exemplary flexible rules work together to prevent errors and to keep accidental errors that might occur from causing significant damage within the exemplary metadirectory 100. A core-centric flexible provisioning rule 418 is responsible for removing the links to associated buffer objects, thereby influencing multiple information sources 118—however, the actual actions that occur on objects in the information sources 118 is defined in an agent-centric de-provisioning rule 420. This allows each information source (each of 120, 122, 124, 126, 128) to implement its own agent-centric logic regarding de-provisioning 314 without interfering with other information sources. The determination of when de-provisioning 314 is to be triggered, however, resides in the unified identity information 111 in the core 112, as the core 112 possesses the complete view of all information sources 118 (e.g., accounts) linked to an identity in the core 112.

The rules for object deleting 430 comprise another type of core-centric exemplary flexible rule that can have a call out allowing the metadirectory user to use custom logic to assess whether a piece of unified identity information 111, i.e., a core object, should be deleted from the core 112. This call-out can be triggered whenever the "join" between a piece of unified identity information 111 and a piece of buffer information 110 is to be broken. The user can assess and compare the piece of unified identity information 111 and the piece of buffer information 110 being un-joined to determine if the piece of unified identity information 111 should be deleted or instead continue to exist (deletion halted); and whether the piece of buffer information 110 being un-joined is authoritative and so should remain after the un-joining from and/or deletion of the piece of unified identity information 111.

If the exemplary metadirectory 100 is an MIIS implementation of the subject matter, a user crafting custom logic for these agent-centric and core-centric exemplary flexible rules can use the full functionality of the .NET™ FRAMEWORK to manipulate attribute values.

Exemplary Engine

Figure 5:
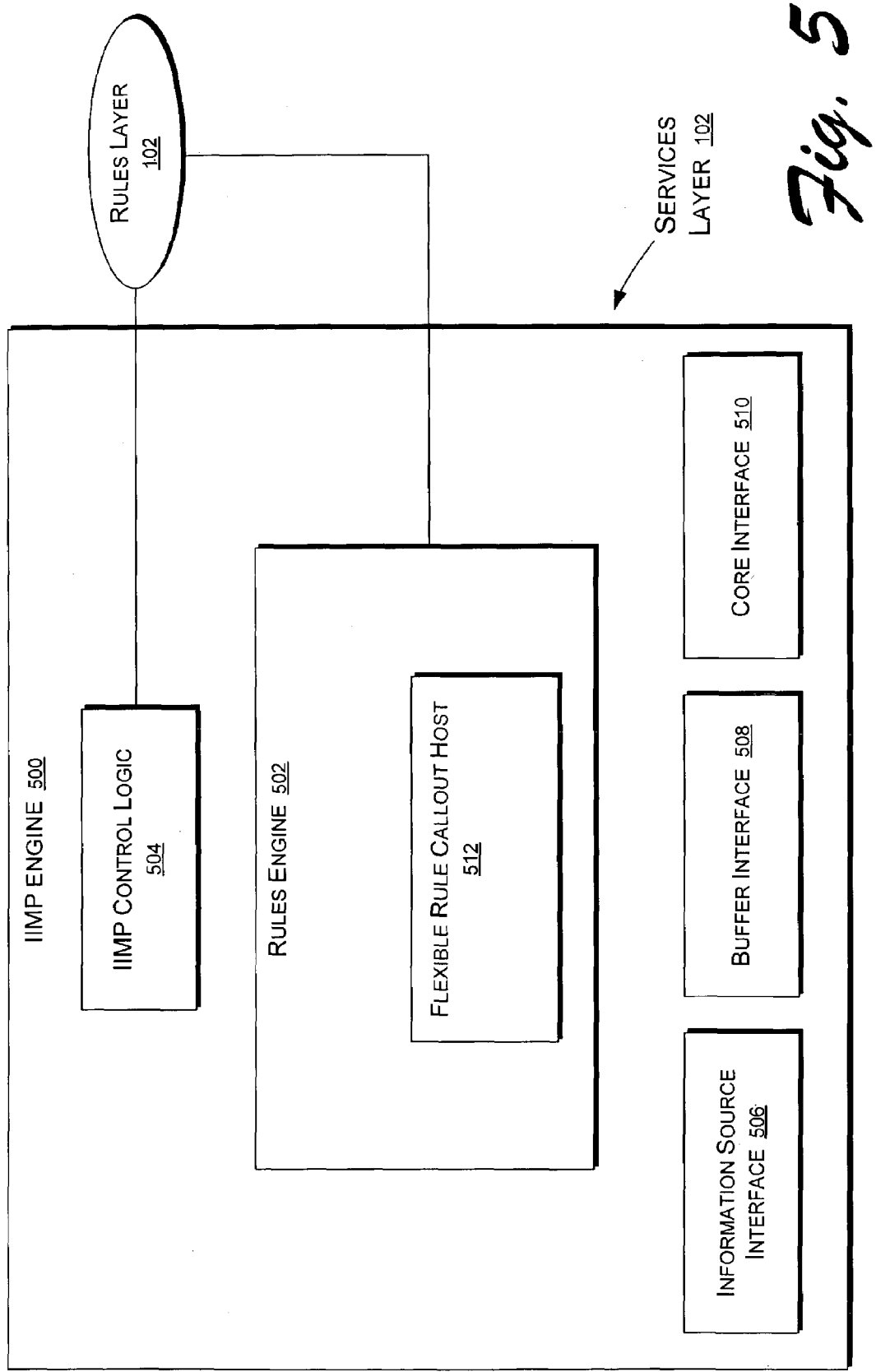
FIG. 5 is a block diagram of an exemplary engine for performing an exemplary identity information management process.

FIG. 5 shows an exemplary IIMP engine 500 for implementing the exemplary IIMP 300, which in turn uses the exemplary set of flexible rules 400. The exemplary IIMP engine 500 allows a user to process identity information according to business rules and custom logic between connected information sources 118 and the core 112 via the buffer 108.

As mentioned, applying business logic to the various heterogeneous connected information sources 118 is a complex task that may be impossible without the exemplary flexible rules 101. The customization needed for specific information sources 118 to be connected to the exemplary metadirectory 100 may vary from business scenario to business scenario.

The exemplary IIMP engine 500 can include a rules engine 502, an IIMP control logic module 504, and various interfaces including a connected information source interface 506, a buffer interface 508, and a core interface 510. The rules engine 502 may further include a flexible rule call out host 512.

In one implementation, when the exemplary flexible rule call out 103 is a rules extension of the MIIS type, a vehicle such as MICROSOFT® VISUAL STUDIO®.NET™ allows the user to enter the custom logic into specific places within a file. When the file is complete the rule extension is integrated into the exemplary metadirectory 100, for example, by the flexible rule call out host 512, which automatically runs the rules extension in the correct logical place in relation to its rule.

In one implementation, the custom logic obtained via a call out 103 can interact with the exemplary IIMP engine 500 to stop an information management process, for example, temporarily blocking synchronizing 130 of a single object, or stopping the process of synchronizing 130 completely. This interaction between an engine, such as exemplary IIMP engine 500, and custom logic can be accomplished through exceptions. During an information management process, both expected and unexpected exceptions can occur. A user can decide which exceptions are non-critical and can be safely ignored, and which exceptions are critical and should abort the synchronization process. Thus, using custom logic to effect an exception that stops an information management process makes a call out 103 effective for determining the outcome of the process. For example, the custom logic obtained via a call out 103 can prevent joining 306 until a certain condition is met even when only one join candidate is found. Likewise, the custom logic can abort an information management run when necessary.

In one implementation, the exemplary IIMP engine 500 passes an individual object through a well-defined and pre-determined sequence of steps, such as the exemplary methods 600, 700, 800 described below. In each of these steps the exemplary IIMP engine 500 calls the rules engine 502. For each step the rules engine 502 then applies all the rules and the custom logic obtained from an exemplary flexible rule call out 103 to the object and usually returns a result from each operation to the exemplary IIMP engine 500 to decide how to proceed with the next operation in the sequence.

It should be noted that the custom logic obtained via a call out performed by an exemplary flexible rule 101 may be tested in various ways. An exemplary IIMP engine 500 can have a mode for runtime testing of the custom logic outside of a real time or "live" information management process and a mode for runtime testing of the custom logic within an actual information management run. The former type of testing is more difficult to perform since the custom logic, e.g., a rules extension, is being tested under conditions that are isolated from the usual information management processes, which may have to be simulated. The latter type of testing is easier to perform, since the custom logic is performed under usual information management conditions, but actual damage caused by an error may be more difficult to prevent.

Exemplary Methods

Figure 6:
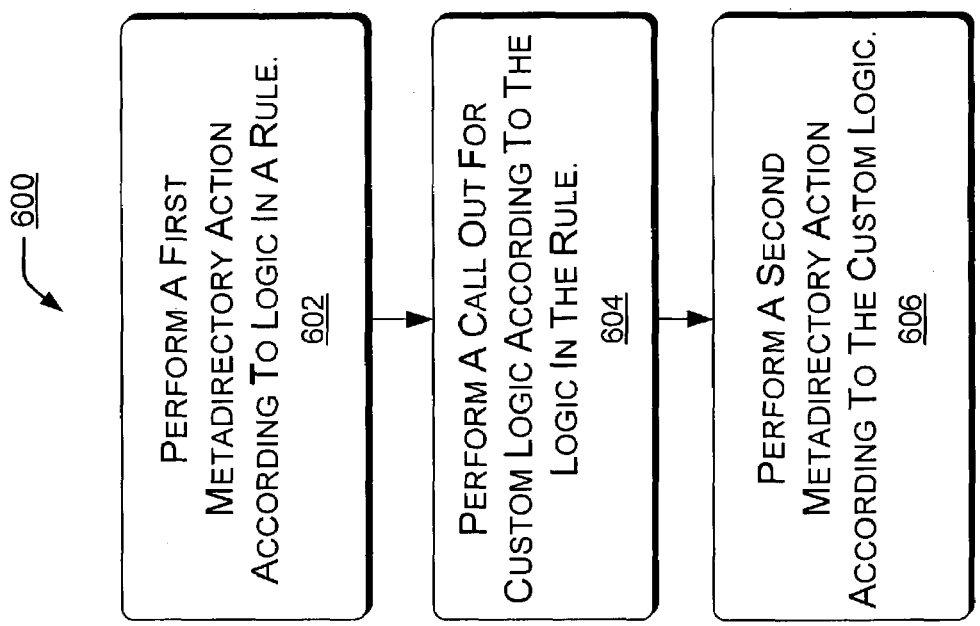
FIG. 6 is a flow diagram of an exemplary method of defining and/or performing a metadirectory action using an exemplary flexible rule.

FIG. 6 shows an exemplary method 600 for defining and/or performing an action in an exemplary metadirectory 100. The operations may be performed in hardware and/or as machine-readable instructions (software or firmware) that can be executed by a processor or engine, such as the exemplary IIMP engine 500.

At block 602, a first metadirectory action is performed according to logic in an exemplary flexible rule.

At block 604, a call out for custom logic is performed according to the logic in the exemplary flexible rule.

At block 606, a second metadirectory action is performed according to the custom logic.

Figure 7:
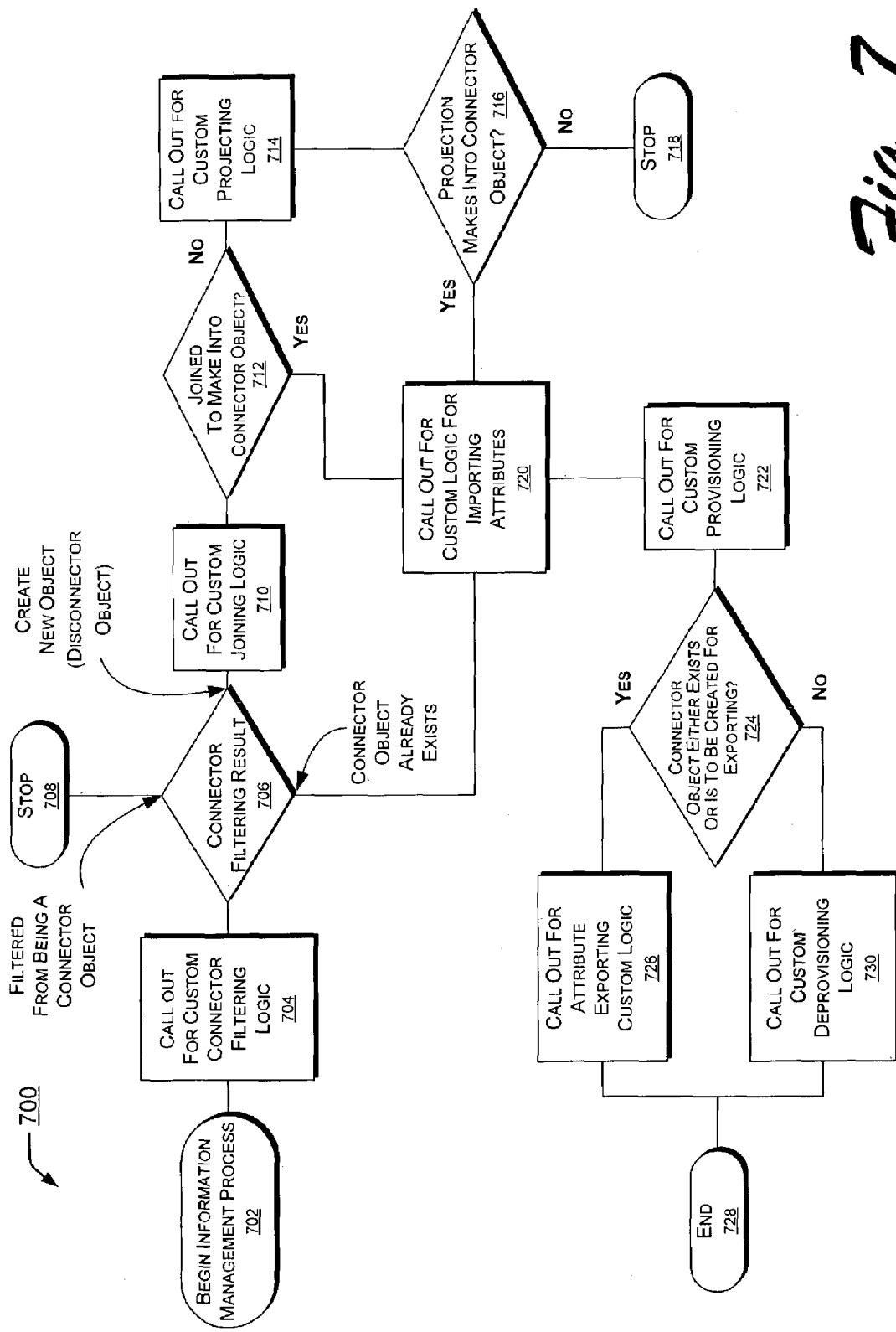
FIG. 7 is a flow diagram of an exemplary information management process using the exemplary flexible rules.

FIG. 7 shows an exemplary identity information management process (IIMP) 700 that uses the exemplary flexible rules 101 in an exemplary database or metadirectory 100. It should be noted that flexible rules 101 are set in action by a service, MA, or engine, such as the exemplary IIMP engine 500, depending on the implementation of the subject matter.

In some implementations of an exemplary metadirectory 100, such as an MIIS implementation, the processes in the exemplary IIMP 700 are executed in a relatively well-defined sequence, that is, an object (e.g., from a connected information source 120) is processed through one or more paths within a well-defined flow of sequences. The illustrated exemplary IIMP 700 demonstrates example points in the well-defined flow of sequences at which call outs 103 for custom logic could be performed. In the flow diagram, the operations are summarized in individual blocks. The operations may be performed in hardware and/or as machine-readable instructions (software or firmware) that can be executed by a processor or engine, as mentioned, such as the exemplary IIMP engine 500.

At block 702, an exemplary information management process 700 begins.

At block 704, a service, an MA, and/or and engine, such as the exemplary IIMP engine 500, uses one or more flexible rules for connector filtering 428 that can perform a call out for custom connector filtering logic. The performance of the custom logic retrieved may determine the outcome of the next action.

At block 706, connector filtering 315 is evaluated to determine if an object can be a connector object or not. If connector filtering 315 determines that the object cannot be a connector object, the object is disconnected (the "join" is broken). If connector filtering 315 determines that the object can be a connector object, then the process 700 branches to a synchronization path at block 710 or block 720.

At block 710, if the object is not already a connector object, a synchronization path first includes an attempt at joining 306 the object to unified identity information 111, but if the object cannot be joined then includes an attempt at projecting 308 the object as unified identity information 111. Connector filtering 315 does not determine if joining 306 or projecting 308 should be used (or both or neither)—these decisions are dependent on whether or not joining 306 and/or projecting 308 rules have been defined.

At block 708, the exemplary IIMP 700 stops if connector filtering 315 determines that the object cannot be processed in a synchronization pathway.

At block 710, the process of joining 306 is attempted by one or more flexible rules for joining 412 that can perform a call out 103 for custom joining logic. Newly imported objects are created as disconnector objects. They become connector objects when they join or project to unified identity information 111 in the core 112, which is not guaranteed to happen given that a piece of custom logic retrieved during the call out 103 may prevent it. The performance of the custom logic may determine the outcome of the next action.

At block 712, the joining result is evaluated. If the connector object or disconnector object is not to be joined to existing unified identity information 111 in the core 112, then the exemplary IIMP 700 proceeds to block 714.

At block 714, since the connector object or disconnector object is not going to be joined to existing unified identity information 111, a service, an MA, or an exemplary IIMP engine 500, etc., uses one or more flexible rules for projecting 414 that can perform a call out for custom projecting logic to determine if the connector object or disconnector object is to be projected into the core 112 as a new piece of unified identity information 111. The performance of the custom logic may determine the outcome of the next action.

At block 716, the results of the projecting are evaluated. If the connector object or disconnector object is not to be projected into the core 112 as a new piece of unified identity information 111, then the exemplary method branches to block 718.

At block 718, the exemplary IIMP 700 stops as the new connector or disconnector object has not been joined to pre-existing unified identity information 111 in the core 112 and has not been projected as new unified identity information 111. The new object is therefore a disconnector object.

Returning to block 716, if the new connector object or disconnector object is to be projected to the core 112 as a new piece of unified identity information 111, then the exemplary IIMP 700 braches to block 720.

At block 720, if the connector object already existed (from block 706) or if the object is new and to be joined to pre-existing unified identity information 111 (from block 712), or if the object is to be projected as new unified identity information 111 (from block 716) then one or more flexible rules for importing attributes 310 can call out for custom logic to flow attributes from or through the new or pre-existing object to the core 112.

At block 722, one or more core services (e.g., one of 208, 210, 212) may use a core-centric flexible rule for provisioning 418 that can call out for custom logic to provision information changes relative to the new object or the newly flowed attributes in order to modify information in the buffer 108, such as connector objects representing one or more of the connected information sources 118.

Hence at block 724, if a connector object exists or has been created in the buffer 108 for exporting, then the exemplary method branches to block 726.

At block 726, a service, an MA, or an exemplary IIMP engine 500 uses one or more flexible rules for exporting attributes 422 that can perform a call out for custom attribute-exporting logic to flow attributes out from the connector object (of block 724) to the buffer 108 and finally to the appropriate connected information sources 118.

Returning to block 724, if there is an object that was just disconnected by provisioning 312 at block 722, then the exemplary IIMP 700 branches to block 730.

At block 730, a service, an MA, or an engine, such as the exemplary IIMP engine 500, uses one or more flexible rules for deprovisioning 420 that can perform a call out for custom deprovisioning logic to decide if a connector object in the buffer 108, which has had its "join" removed can remain a disconnector object in the buffer 108, or whether the connector object 214, 216, 218, which is no longer relevant to provisioning 312, should be deleted from the buffer 108. If the exemplary flexible rule for deprovisioning 420 decides to delete, the object may eventually be deleted from a connected information source 118.

At block 728, the exemplary IIMP 700 ends after following the provisioning branch (from block 726) or the deprovisioning branch (from block 730).

Figure 8:
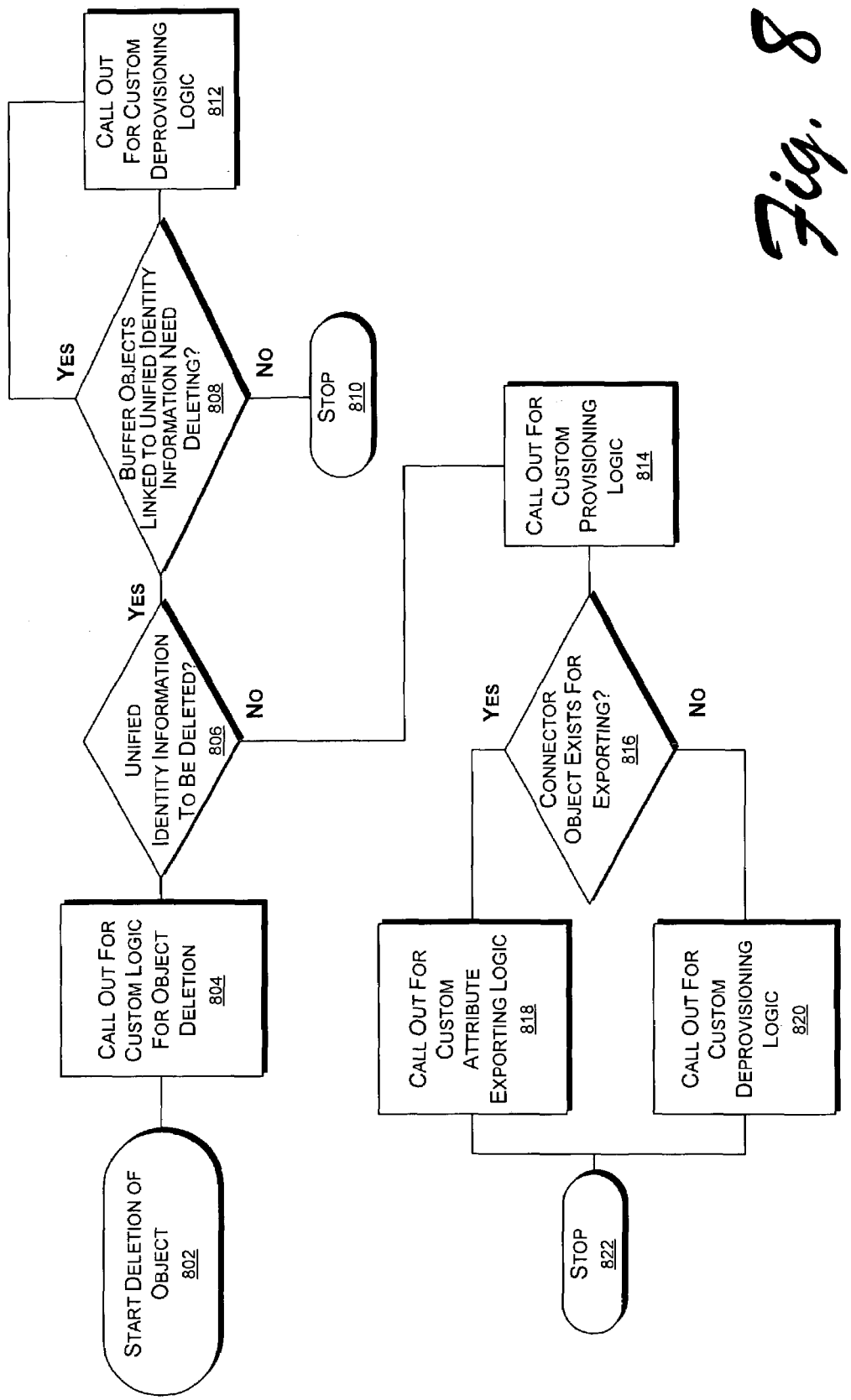
FIG. 8 is a flow diagram of another exemplary method of using the exemplary flexible rules.

FIG. 8 shows another exemplary IIMP 800 using the exemplary flexible rules 101 in an exemplary metadirectory 100. The exemplary IIMP 800 includes deletion of an object from the buffer 108 using one or more exemplary core-centric flexible rules for object deleting 430. An exemplary flexible rule for object deleting 430 may also address the case wherein connector filtering 428 changes and decides that an object should be a disconnector object. The connector object becomes disconnected and the flexible rules for object deleting 430 determine if a corresponding object in the core 112 should be deleted.

In the flow diagram, the operations are summarized in individual blocks. The exemplary IIMP 800 demonstrates example points at which call outs 103 for custom logic could be performed. The operations may be performed in hardware and/or as machine-readable instructions (software or firmware) that can be executed by a service, an agent, such as an MA, and/or a processor or engine, such as the exemplary IIMP engine 500.

At block 802, the exemplary IIMP 800, which as mentioned above can be used to delete an object in the buffer 108, begins. Deleting an object from the buffer 108 further triggers a determination of whether an object in the core 112 associated with the object in the buffer 108 should also be deleted.

At block 804, a service, such as a core service (e.g., one of 208, 210, 212), uses one or more flexible rules for object deleting 430 that can perform a call out for custom logic for the deletion of the unified identity information object 111. The performance of the custom logic may determine the outcome of the next action.

At block 806, the object deletion is evaluated. If the associated unified identity information object 111 gets deleted, then the exemplary method branches to block 808. If the unified identity information object 111 does not get deleted, then the exemplary method branches to block 814. In one implementation, the flexible rule for object deleting 430 requests an object deletion by passing a "yes" or "no" value to an object deleting mechanism in the exemplary metadirectory 100.

At block 808, the disconnection of buffer objects linked to unify identity information 111 to be deleted is processed. After a "core-centric" rule for object deleting 430 decides that an identity in the core 112 needs to be deleted, the rule triggers an "agent-centric" deprovisioning rule 420 which may call out for custom deprovisioning logic at block 812 to determine which objects to deprovision. If a rule for deprovisioning 420 is not triggered, then the exemplary method branches to block 810.

At block 810, if there are no disconnected objects related to the deleted unified identity information object 111, then the exemplary IIMP 800 stops.

At block 812, a service, such as an MA, or the exemplary IIMP engine 500, uses one or more flexible rules for deprovisioning 420 that can perform a call out for custom deprovisioning logic to decide if a connector object (e.g., one of 214, 216, 218) in the buffer 108, which has had its "join" removed because its unified identity information object 111 has been deleted, can remain a disconnector object in the buffer 108 or whether the connector object, which is no longer relevant to provisioning 312, should be deleted from the buffer 108, and an associated object removed from a connected information source 118.

At block 814, one or more core services (e.g., one of 208, 210, 212) may use a core-centric flexible rule for provisioning 418 that can call out for custom logic to provision information changes relative to the undeleted unified identity information object (from block 806) for one or more of the connected information sources 118.

Hence at block 816, if a connector object exists or has been created in the buffer 108 for exporting, then the exemplary method branches to block 818.

At block 818, a service, e.g., the exemplary IIMP engine 500, uses one or more flexible rules for exporting attributes 422 that can perform a call out for custom attribute exporting logic to flow attributes out from an object in the core 112 to an associated object in the buffer 108.

Returning to block 816, if a connector object for staging exporting does not exist or has not been created, then the exemplary IIMP 800 branches to block 820.

At block 820, a service, such as the exemplary IIMP engine 500, uses one or more flexible rules for deprovisioning 420 that can perform a call out for custom deprovisioning logic to decide if a connector object in the buffer 108, which has had its "join" removed can remain a disconnector object in the buffer 108, or whether the connector object 214, 216, 218, which is no longer relevant to provisioning 312, should be deleted from the buffer 108. If the exemplary flexible rule for deprovisioning 420 decides to delete, the object may also be eventually deleted from a connected information source 118.

At block 822, the exemplary IIMP 800 ends after following the provisioning branch (from block 818) or the deprovisioning branch (from block 820).

Exemplary Computing Device

FIG. 9 shows an exemplary computer 900 suitable as an environment for practicing aspects of the subject matter. The components of exemplary computer 900 may include, but are not limited to, a processing unit 920, a system memory 930, and a system bus 921 that couples various system components including the system memory 930 to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 900 typically includes a variety of computer-readable media. Computer-readable media can be any available media that can be accessed by exemplary computer 900 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within exemplary computer 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, the exemplary metadirectory 100, application programs 935, other program modules 936, and program data 937. Although the exemplary metadirectory 100 is depicted as software in random access memory 932, other implementations of an exemplary metadirectory 100 can be hardware or combinations of software and hardware.

The exemplary computer 900 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface such as interface 950.

The drives and their associated computer storage media discussed above and illustrated in FIG. 9 provide storage of computer-readable instructions, data structures, program modules, and other data for exemplary computer 900. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the exemplary computer 900 through input devices such as a keyboard 962 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port, or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 995.

The exemplary computer 900 may operate in a networked environment using logical connections to one or more remote computers, such as a remote computer 980. The remote computer 980 may be a personal computer, a server, a router, a network PC, a peer device or other common network node, and typically includes many or all of the elements described above relative to exemplary computer 900, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets, and the Internet.

When used in a LAN networking environment, the exemplary computer 900 is connected to the LAN 971 through a network interface or adapter 970. When used in a WAN networking environment, the exemplary computer 900 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the exemplary computer 900, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

CONCLUSION

The foregoing describes exemplary flexible rules for defining an exemplary metadirectory. For example, an exemplary flexible rule can have inherent logic to perform part of a metadirectory action and to perform a call out for custom logic. The custom logic called out for allows the exemplary flexible rule to perform another part of the metadirectory action. The metadirectory action may be a simple information processing step or may be a complex process. The subject matter described above can be implemented in hardware, in software, or in both hardware and software. In certain implementations, the exemplary flexible rules, identity information management processes, engines, and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A storage medium including processor-executable instructions, which when executed, implement one or more metadirectory rules for defining a structure of a metadirectory and for executing one or more operations of the metadirectory, comprising:

a static part of each metadirectory rule that defines a metadirectory operation;

a flexible part of each metadirectory rule comprising customizable logic to customize the metadirectory operation defined by the static part;

wherein the static part maintains stability of the metadirectory structure and operation upon execution of the flexible part;

wherein the metadirectory defined at least in part by the metadirectory rule includes a connector space for staging objects to and from a core of the metadirectory;

wherein management agents in the connector space adapt and transfer information between remote information sources and the connector space;

wherein connector objects in the connector space join and disjoin one or more staged objects in the connector space to one or more unified identity objects in the core;

wherein each management agent and each connector object embodies one or more of the metadirectory rules; and wherein an interrelated set of the metadirectory rules defines a rules engine to decide between conditional join pathways, conditional synchronization pathways, and conditional attribute flow pathways in the metadirectory in order to define a specific management sequence for each staged object in the connector space.

2. The storage medium as recited in claim 1, wherein the flexible part is altered by custom logic imported into the metadirectory rule by the static part.

3. The storage medium as recited in claim 1, wherein the interrelated set of metadirectory rules defining the rules engine includes interrelated agent-centric and core-centric rules;

wherein the agent-centric rules include rules for inbound and outbound data transforming, rules for joining and join resolving, rules for deprovisioning, rules for connector filtering, rules for projecting, and rules for importing and exporting attributes; and wherein the core-centric rules include rules for provisioning, rules for object deletion of core information, and rules for controlling multiple different connected information sources from the unified identity information in the core.

4. The storage medium as recited in claim 1, wherein the rules engine applies the interrelated set of metadirectory rules, including custom logic, to each staged object and returns a result from an operation of each rule to decide how to proceed with a next operation in the specific management sequence for the staged object.

5. The storage medium as recited in claim 1, wherein the rules engine performs connector filtering to determine if the staged object can be a connector object or not, wherein if the connector filtering determines that the staged object cannot be a connector object then the staged object either remains a disconnector object or the rules engine disconnects the join of the staged object to make the staged object a disconnector object, but if the connector filtering determines that the staged object can be a connector object, then the rules engine branches to a synchronization path.

6. The storage medium as recited in claim 5, wherein if the staged object is not already a connector object, then the synchronization path implemented by the rules engine first includes an attempt at joining the staged object to unified identity information in the core, but if the staged object cannot be joined then the synchronization path includes an attempt at projecting the staged object as new unified identity information.

7. The storage medium as recited in claim 5, wherein the rules engine pauses the specific management sequence if the connector filtering determines that the object cannot be processed in a synchronization path.

8. The storage medium as recited in claim 5, wherein if the new connector object or disconnector object is to be projected to the core as a new piece of unified identity information, then if the connector object already existed or if the object is new and to be joined to pre-existing unified identity information, or if the object is to be projected as new unified identity information, then the rules engine decides whether to import attributes to flow the attributes from or though the new or pre-existing object to the core.

9. The storage medium as recited in claim 1, wherein a newly imported object is created as a disconnector object and the newly imported object becomes a connector object if the rules engine joins or projects the newly imported object to unified identity information in the core.

10. The storage medium as recited in claim 1, wherein if an object is disconnected by a rule for deprovisioning then the rules engine decides whether a connector object in the connector space that has had its join removed can remain a disconnector object in the connector space, or whether the connector object, which is no longer relevant to provisioning, is to be deleted from the connector space.

11. The storage medium as recited in claim 10, wherein if the rule for deprovisioning decides to delete the connector object, then the rules engine decides whether to delete a corresponding object from a remote information source.

12. A storage medium including processor-executable instructions, which when executed, implement a flexible metadirectory rule, comprising:
a call out element, wherein the flexible metadirectory rule imports custom logic to increase its own flexibility; and
a static logic element, wherein the flexible metadirectory rule controls its own flexibility to maintain a stability of a metadirectory;
wherein the metadirectory includes a connector space for staging objects to and from a core of the metadirectory;
wherein management agents in the connector space adapt and transfer information between remote information sources and the connector space;
wherein connector objects in the connector space join and disjoin one or more staged objects in the connector space to one or more unified identity objects in the core;
wherein the management agents and the connector objects each embody one or more of the metadirectory rules; and
wherein an interrelated set of the metadirectory rules defines a rules engine to decide between conditional join pathways, conditional synchronization pathways, and conditional attribute flow pathways in the metadirectory in order to define a specific management sequence for each staged object in the connector space.

13. The storage medium as recited in claim 12, further comprising instructions that implement a plurality of the flexible metadirectory rules, wherein one flexible metadirectory rule within the plurality controls its own flexibility based on custom logic imported into one or more other flexible metadirectory rules in the plurality.

14. The storage medium as recited in claim 13, wherein the plurality of flexible metadirectory rules define a sequence of services comprising a flexible metadirectory information management process.

15. The storage medium as recited in claim 14, wherein the flexible metadirectory information management process controls its own flexibility to remain portable between many different types of business settings.

16. The storage medium as recited in claim 12, wherein the call out element calls outside of the metadirectory for further processing.

17. The storage medium as recited in claim 16, wherein the call out element comprises an interface with a workflow system outside the metadirectory system and includes logic to bind external logic to the metadirectory.

18. The storage medium as recited in claim 12, wherein the call out element comprises custom auditing logic to add an auditing capability to the metadirectory rule.

19. The storage medium as recited in claim 12, wherein the call out element comprises custom pre-processing logic and post-processing logic to add the pre-processing or the post-processing logic to the metadirectory rule.

20. The storage medium as recited in claim 12, wherein the call out element comprises data transformation logic to add a data transformation capability to the metadirectory rule.

* * * * *